US005933569A

United States Patent [19]
Sawabe et al.

[11] Patent Number: 5,933,569
[45] Date of Patent: Aug. 3, 1999

[54] INFORMATION RECORDING MEDIUM APPARATUS FOR RECORDING THE SAME AND APPARATUS FOR REPRODUCING THE SAME

[75] Inventors: Takao Sawabe, Tokyo-to; Ryuichiro Yoshimura, Tokorozawa; Yoshiaki Moriyama, Tsurugashima; Kaoru Yamamoto, Tsurugashima; Akihiro Tozaki, Tsurugashima; Junichi Yoshio, Tokorozawa, all of Japan

[73] Assignee: Pioneer Electronic Corporation, Tokyo-to, Japan

[21] Appl. No.: 08/816,889

[22] Filed: Mar. 13, 1997

[30] Foreign Application Priority Data

Mar. 15, 1996 [JP] Japan .................................. 8-059834

[51] Int. Cl.$^6$ ..................................................... H04N 5/91
[52] U.S. Cl. ................................ 386/94; 386/45; 386/125
[58] Field of Search ................................... 386/1, 45, 70, 386/94, 95, 96, 97, 125–126; 380/5, 20; H04N 5/91

[56] References Cited

U.S. PATENT DOCUMENTS 5,418,713  5/1995  Allen ........................................ 364/403
5,574,567  11/1996  Cookson et al. ........................... 386/46
5,691,972  11/1997  Tsunga et al. ........................... 369/275.3
5,784,528  7/1998  Yamane et al. ........................... 386/112

FOREIGN PATENT DOCUMENTS 0 668 695 A2  8/1995  European Pat. Off. .
0 677 842 A1  10/1995  European Pat. Off. .
0 737 974 A2  10/1996  European Pat. Off. .

Primary Examiner—Wendy Garber
Assistant Examiner—Vincent F. Boccio
Attorney, Agent, or Firm—Morgan, Lewis & Bockius LLP

[57] ABSTRACT

An information recording medium is recorded with a plurality of data groups, each including at least one of video information and audio information and a reproduction permission level by which a reproduction of at least one of the video information and the audio information is permitted; and a reproduction management information including the reproduction permission range information for prescribing the range of the reproduction permission level for the data group which reproduction is permitted. When the reproduction permission level and the reproduction management information are selected, the range of the reproduction permission level of the data groups which reproduction are permitted is detected on the basis of the reproduction permission level selected. Then, the data group is reproduced when the reproduction permission level of the selected data group is included in the range of the reproduction permission level detected.

10 Claims, 15 Drawing Sheets

PARENTAL MANAGEMENT TABLE

| | | 7 | 6 | 5 | 4 | 3 | 2 | 1 | 0 |
|---|---|---|---|---|---|---|---|---|---|
| U. S. | LVL #1 (X) ☆ | 0 | 0 | 1 | 1 | 1 | 0 | 0 | 1 |
| | LVL #2 (R) | 0 | 0 | 1 | 1 | 1 | 0 | 0 | 1 |
| | LVL #3 (NC17) ☆ | 0 | 0 | 0 | 1 | 1 | 0 | 0 | 1 |
| | LVL #4 (PG13) ☆ | 0 | 0 | 0 | 0 | 1 | 0 | 0 | 1 |
| | LVL #5 (PG) | 0 | 0 | 0 | 0 | 0 | 0 | 0 | 1 |
| | LVL #6 (G) | 0 | 0 | 0 | 0 | 0 | 0 | 0 | 1 |
| JAPAN | LVL #1 (O18) ☆ | 0 | 0 | 1 | 1 | 1 | 0 | 0 | 1 |
| | LVL #2 (U17) ☆ | 0 | 0 | 0 | 1 | 1 | 0 | 0 | 1 |

PHYSICAL STRUCTRE OF RECORD INFORMATION
(PHYSICAL FORMAT)

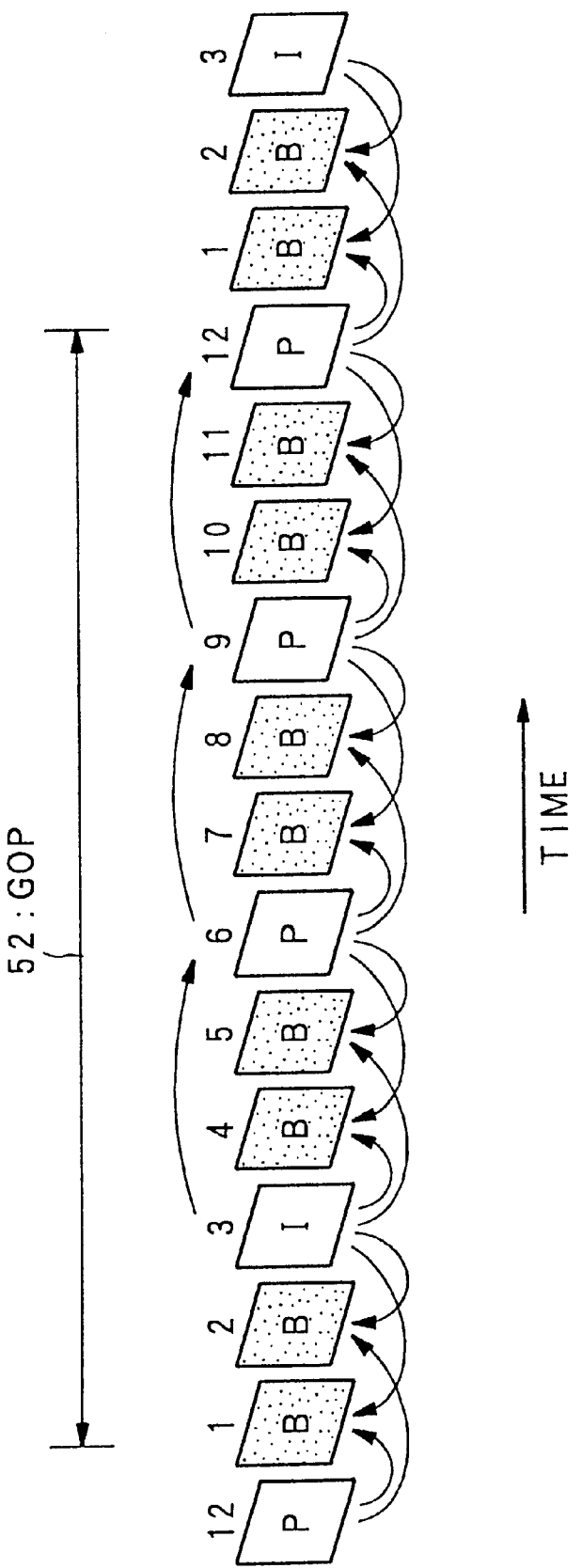

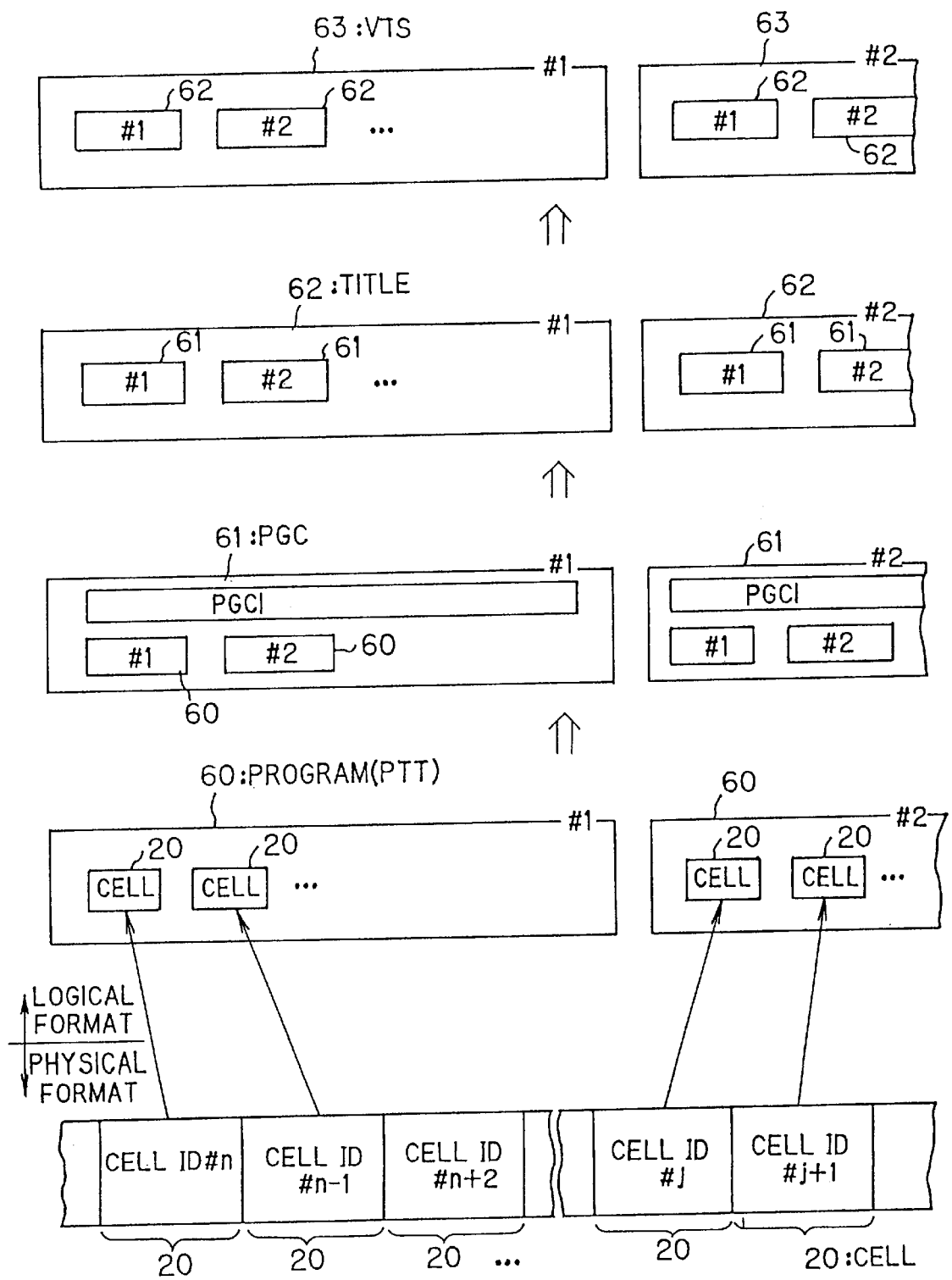

STRUCTURE OF INTERLEAVED UNIT

IU : INTERLEAVED UNIT

FIG. 5

|  | | U.S. LEVEL | ID | JAPAN LEVEL |
|---|---|---|---|---|
| VTS | T1 : | R | 5 | O18 |
|  | T2 : | G | 0 | U17 |
|  | T3 : | NC17 | 4 | U17 |
|  | T4 : | PG13 | 3 | U17 |
|  | T5 : | R | 5 | O18 |

O18 : FOR ADULT
U17 : FOR GENERAL PEOPLE

FIG. 6

PARENTAL MANAGEMENT TABLE

| | | 7 6 5 4 3 2 1 0 |
|---|---|---|
| U.S. | LVL #1 (X) | ☆(7) 0 0 1 1 1 0 0 1 |
|  | LVL #2 (R) | 0 0 1 1 1 0 0 1 |
|  | LVL #3 (NC17) | ☆(5) 0 0 0 1 1 0 0 1 |
|  | LVL #4 (PG13) | ☆(4) 0 0 0 0 1 0 0 1 |
|  | LVL #5 (PG) | 0 0 0 0 0 0 0 1 |
|  | LVL #6 (G) | 0 0 0 0 0 0 0 1 |
| JAPAN | LVL #1 (O18) | ☆(5) 0 0 1 1 1 0 0 1 |
|  | LVL #2 (U17) | ☆(4) 0 0 0 1 1 0 0 1 |

FIG. 7

TITLE PARENTAL ID IN INFORMATION TABLE OF
TITLE RECORDED ON DISK

```
      7 6 5 4 3 2 1 0
T 1  [0|0|1|0|0|0|0|0]  ← TITLE PARENTAL ID
                          IS DESCRIBED BY "1"
T 2  [0|0|0|0|0|0|0|1]

T 3  [0|0|0|1|0|0|0|0]

T 4  [0|0|0|0|1|0|0|0]

T 5  [0|0|1|0|0|0|0|0]
```

| VTS#1 | U.S. LEVEL | JAPAN LEVEL | P_ID |
|---|---|---|---|
| T1 | G | U17 | 3 |
| T2 | PG13 | O18 | 1 |
| T3 | R | O18 | 5 |
| VTS#2 | | | |
| T4 | G | U17 | 3 |
| T5 | NC17 | U17 | 2 |
| T6 | R | O18 | 4 |

FIG.11

| | | | 7 | 6 | 5 | 4 | 3 | 2 | 1 | 0 |
|---|---|---|---|---|---|---|---|---|---|---|
| PMT1 U.S. | P_LVL #1 (X) | P_ID_VTS#1 | 0 | 0 | 0 | 0 | 0 | 0 | 0 | 0 |
| | | P_ID_VTS#2 | 0 | 0 | 0 | 0 | 0 | 0 | 0 | 0 |
| | P_LVL #2 (R) | P_ID_VTS#1 | 0 | 0 | 1 | 0 | 1 | 0 | 1 | 0 |
| | | P_ID_VTS#2 | 0 | 0 | 0 | 1 | 1 | 1 | 0 | 0 |
| | P_LVL #3 (NC17) | P_ID_VTS#1 | 0 | 0 | 0 | 0 | 1 | 0 | 1 | 0 |
| | | P_ID_VTS#2 | 0 | 0 | 0 | 0 | 1 | 1 | 0 | 0 |
| | P_LVL #4 (PG13) | P_ID_VTS#1 | 0 | 0 | 0 | 0 | 1 | 0 | 1 | 0 |
| | | P_ID_VTS#2 | 0 | 0 | 0 | 0 | 1 | 0 | 0 | 0 |
| | P_LVL #5 (PG) | P_ID_VTS#1 | 0 | 0 | 0 | 0 | 1 | 0 | 0 | 0 |
| | | P_ID_VTS#2 | 0 | 0 | 0 | 0 | 1 | 0 | 0 | 0 |
| | P_LVL #6 (G) | P_ID_VTS#1 | 0 | 0 | 0 | 0 | 1 | 0 | 0 | 0 |
| | | P_ID_VTS#2 | 0 | 0 | 0 | 0 | 1 | 0 | 0 | 0 |
| PMT2 JAPAN | P_LVL #1 (O18) | P_ID_VTS#1 | 0 | 0 | 1 | 0 | 1 | 0 | 1 | 0 |
| | | P_ID_VTS#2 | 0 | 0 | 0 | 1 | 1 | 1 | 0 | 0 |
| | P_LVL #2 (U17) | P_ID_VTS#1 | 0 | 0 | 0 | 0 | 1 | 0 | 0 | 0 |
| | | P_ID_VTS#2 | 0 | 0 | 0 | 0 | 1 | 1 | 0 | 0 |

ACTUAL PMT

FIG.12A

|  | 7 | 6 | 5 | 4 | 3 | 2 | 1 | 0 |  | U.S. | JAPAN |
|---|---|---|---|---|---|---|---|---|---|---|---|
| VTS#1 1 | 0 | 0 | 0 | 0 | 1 | 0 | 0 | 0 | T1 | (G) | (U17) |
| VTS#1 2 | 0 | 0 | 0 | 0 | 0 | 0 | 1 | 0 | T2 | (PG13) | (O18) |
| VTS#1 3 | 0 | 0 | 1 | 0 | 0 | 0 | 0 | 0 | T3 | (R) | (O18) |
| VTS#2 4 | 0 | 0 | 0 | 0 | 1 | 0 | 0 | 0 | T4 | (G) | (U17) |
| VTS#2 5 | 0 | 0 | 0 | 0 | 0 | 1 | 0 | 0 | T5 | (NC17) | (U17) |
| VTS#2 6 | 0 | 0 | 0 | 1 | 0 | 0 | 0 | 0 | T6 | (R) | (O18) |

FIG.12B

|  | 7 | 6 | 5 | 4 | 3 | 2 | 1 | 0 |
|---|---|---|---|---|---|---|---|---|
| VTS#1 | 0 | 0 | 0 | 0 | 1 | 0 | 1 | 0 |
| VTS#2 | 0 | 0 | 0 | 0 | 1 | 0 | 0 | 0 |

FIG. 14A

| PMT | | 7 | 6 | 5 | 4 | 3 | 2 | 1 | 0 |
|---|---|---|---|---|---|---|---|---|---|
| | P_LVL#1 | 0 | 0 | 1 | 0 | 1 | 0 | 1 | 0 |
| | P_LVL#2 | 0 | 0 | 0 | 0 | 1 | 0 | 1 | 0 |
| | P_LVL#3 | 0 | 0 | 0 | 0 | 1 | 0 | 1 | 0 |
| | P_LVL#4 | 0 | 0 | 0 | 0 | 1 | 0 | 1 | 0 |
| | P_LVL#5 | 0 | 0 | 0 | 0 | 1 | 0 | 0 | 0 |
| | P_LVL#6 | 0 | 0 | 0 | 0 | 1 | 0 | 0 | 0 |

ACTUAL PMT

FIG. 14B

PTL_ID OF TT_SRP IN VTS#1

| | 7 | 6 | 5 | 4 | 3 | 2 | 1 | 0 |
|---|---|---|---|---|---|---|---|---|
| T1 | | | | | 1 | | 1 | |
| T2 | | 1 | | | | | 1 | |

FIG. 14C

| 7 | 6 | 5 | 4 | 3 | 2 | 1 | 0 |
|---|---|---|---|---|---|---|---|
| | | | | 1 | | 1 | |

INFORMATION RECORDING MEDIUM APPARATUS FOR RECORDING THE SAME AND APPARATUS FOR REPRODUCING THE SAME

BACKGROUND OF THE INVENTION

1. Field of the Invention

The present invention relates to an information recording medium, such as an optical disk of a high recording density type, which is capable of recording as video information, audio information and the like, at a high density, and which is exemplified by a DVD (Digital Video or Versatile Disk). The present invention also relates to a recording apparatus for recording the information onto the information recording medium, and a reproducing apparatus for reproducing the information from the information recording medium.

2. Description of the Related Art

Conventionally, an LD (Laser Disk) and a CD (Compact Disk) are generally referred to as optical disks, on which video information, audio information, and the like, is recorded.

On the LD, the video information and the audio information are recorded together with time information indicating a time at which each information is to be reproduced with respect to a reproduction start position, which each LD includes at a standard position. Thus, other than a general normal reproduction to reproduce the recorded information in the order of recording, various special reproductions are possible, such as a reproduction to extract and listen to an only desirable portion of recorded music on the disc, a reproduction to listen to the recorded music in a random order and so on, in case of the CD, for example.

However, there is a problem that, according to the above mentioned LD or the like, a so-called interactive and variegated reproduction is not possible in which the audience can have a plurality of selection branches as for the video or audio information to be displayed or outputted and in which the audience can select to watch or listen to.

In particular, in conventional arrangements, it is impossible for a user to choose the language used in the subtitle on the screen (e.g., from subtitles in Japanese and the original language) in the case of watching a foreign movie recorded on a LD or to choose the voices of a song (e.g., from English voices or Japanese Voices) in the case of listening to the music recorded on a CD.

Recently, apart from the above-mentioned conventional CD, it is proposed and developed a DVD which is an optical disc which disc size is identical to CD and which recording capacity is enhanced to be approximately ten times larger than that of CD. Generally, there is employed a function called "parental control" in the DVD system. Parental control is a control method which enables the DVD player to judge information portions which parents do not want to show their kids and automatically execute the choice of the information and the reproduction of the recorded program without those portions. The player is set (user-alterable) a parental level prescribing the information that the player itself can reproduce, and chooses PGCs (ProGram Chain) in consideration of the parental level to reproduce information. With the aid of the function of the parental control, it is possible to record simultaneously-advancing multi-stories on a single disk. However, since the parental levels are different from country to country, it is desired that an identical disk can be reproduced in different ways according to the parental levels which are set differently in various countries.

SUMMARY OF THE INVENTION

It is therefore an object of the present invention to provide an information recording medium, an apparatus for recording the same, and an apparatus for reproducing the same, in which an identical disk can be reproduced according to different parental levels that are differently set in different countries.

According to one aspect of the present invention, there is provided an information recording medium reproduced by an information reproducing apparatus which includes: a level selecting unit for selecting a reproduction permission level; a data group selecting unit for selecting one data group out of a plurality of data groups; a detecting unit for detecting a range of the reproduction permission level of the data group, which reproduction is permitted, on the basis of the reproduction permission level selected; and a reproducing unit for reproducing the data group if the reproduction permission level of the selected data group is included in the range of the reproduction permission level detected, the information recording medium including a data structure stored in the information recording medium and including: a plurality of data groups, each including at least one of video information and audio information and a reproduction permission level indicative of a level by which a reproduction of at least one of the video information and the audio information is permitted; and a reproduction management information including the reproduction permission range information for prescribing the range of the reproduction permission level, on the basis of the reproduction permission levels, for the data group which reproduction is permitted.

In accordance with the recording medium thus configured, the recording medium is recorded with a plurality of data groups, each including at least one of video information and audio information and a reproduction permission level indicative of a level by which a reproduction of at least one of the video information and the audio information is permitted; and a reproduction management information including the reproduction permission range information for prescribing the range of the reproduction permission level, on the basis of the reproduction permission levels, for the data group which reproduction is permitted. The information reproducing apparatus performs the reproduction in the following manner. Namely, the level selecting unit selects a reproduction permission level, and the data group selecting unit selects one data group out of a plurality of data groups. The detecting unit detects a range of the reproduction permission level of the data group, which reproduction is permitted, on the basis of the reproduction permission level selected, and the reproducing unit reproduces the data group if the reproduction permission level of the selected data group is included in the range of the reproduction permission level detected.

The information recording medium may be configured such that the reproduction management information includes a plurality of the reproduction permission range information, and one reproduction permission range information is selected by the reproducing apparatus from the plurality of the reproduction permission range information.

According to another aspect of the present invention, there is provided an information recording apparatus for recording information on an information recording medium reproduced by an information reproducing apparatus which includes: a level selecting unit for selecting a reproduction permission level; a data group selecting unit for selecting one data group out of a plurality of data groups; a detecting unit for detecting a range of the reproduction permission level of the data group, which reproduction is permitted, on the basis of the reproduction permission level selected; and a reproducing unit for reproducing the data group if the reproduction permission level of the selected data group is included in the range of the reproduction permission level detected, the information recording apparatus including: a first recording unit for recording, on the information recording medium, a plurality of data groups, each including at least one of video information and audio information and a reproduction permission level indicative of a level by which a reproduction of at least one of the video information and the audio information is permitted; and a second recording unit for recording, on the information recording medium, a reproduction management information including the reproduction permission range information for prescribing the range of the reproduction permission level, on the basis of the reproduction permission levels, for the data group which reproduction is permitted.

In accordance with the recording apparatus thus configured, the first recording unit records, on the information recording medium, a plurality of data groups, each including at least one of video information and audio information and a reproduction permission level indicative of a level by which a reproduction of at least one of the video information and the audio information is permitted. The second recording unit records, on the information recording medium, a reproduction management information including the reproduction permission range information for prescribing the range of the reproduction permission level, on the basis of the reproduction permission levels, for the data group which reproduction is permitted.

The information recording apparatus may be configured such that the second recording unit includes a plurality of the reproduction permission range information selected by the information reproducing apparatus in the reproduction management information.

According to still another aspect of the present invention, there is provided an information reproducing apparatus for reproducing an information recording medium which is recorded with a plurality of data groups, each including at least one of video information and audio information and a reproduction permission level by which a reproduction of at least one of the video information and the audio information is permitted; and a reproduction management information including the reproduction permission range information for prescribing the range of the reproduction permission level, on the basis of the reproduction permission levels, for the data group which reproduction is permitted, the reproducing apparatus including: a level selecting unit for selecting the reproduction permission level; a data group selecting unit for selecting one data group out of the plurality of the data groups; a detecting unit for detecting, from the reproduction permission range information, the range of the reproduction permission level of the data group, which reproduction is permitted, on the basis of the selected reproduction permission level selected; a judging unit for judging whether or not the reproduction permission level of the selected data group is included in the range of the reproduction permission level detected; and a reproducing unit for reproducing the data group if the judging unit determined that the reproduction permission level of the selected data group is included in the range of the reproduction permission level detected.

In accordance with the reproducing apparatus thus configured, the level selecting unit selects the reproduction permission level, and the data group selecting unit selects one data group out of the plurality of the data groups. The detecting unit detects, from the reproduction permission range information, the range of the reproduction permission level of the data group, which reproduction is permitted, on the basis of the selected reproduction permission level selected. The judging unit judges whether or not the reproduction permission level of the selected data group is included in the range of the reproduction permission level detected, and the reproducing unit reproduces the data group if the judging unit determined that the reproduction permission level of the selected data group is included in the range of the reproduction permission level detected.

The information reproducing apparatus may be configured such that the reproducing unit does not perform reproduction when the judging unit determines that the reproduction permission level of the detected data group is not included in the range of the reproduction permission level detected.

Further, the information reproducing apparatus may be configured such that the reproduction management information includes a plurality of the reproduction permission range information, and the reproducing apparatus further including a reproduction permission range information selecting unit for selecting one reproduction permission range information out of the plurality of the reproduction permission range information.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIG. 2 is a diagram showing frame pictures constructing a GOP;

FIG. 3 is a diagram showing a logical structure of the record information of the DVD in FIG. 1;

FIG. 5 is a diagram illustrating a correspondence between parental levels of United States and Japan for each Video Title Set and parental IDs;

FIG. 6 is a diagram illustrating an example of parental management table (a chart showing the relationship of parental level and parental ID);

FIG. 7 is a diagram illustrating an example of title parental IDs;

FIG. 11 is a diagram illustrating an example of parental management table (PMT);

FIG. 12A is a diagram illustrating examples of parental IDs;

FIG. 12B is a diagram illustrating examples of title parental IDs;

FIGS. 14A to 14C are diagrams illustrating examples of parental IDs;

DETAILED DESCRIPTION OF THE PREFERRED EMBODIMENTS

Referring to the accompanying drawings, embodiments of the present invention will be now explained. The following explanations will be done for the embodiments, in which the present invention is applied to the aforementioned DVD.

In the following embodiments, constitutional elements listed on a right hand side in a following list respectively construct examples of constitutional elements of the present invention listed on a left hand side in the following list.
Data group: Title
Reproduction permission level: cell
Reproduction management information: Video manager
Reproduction permission area information: Parental management table

(I) Embodiment of Information Recording Medium

First of all, a physical structure and a logical structure as well as an operation of a DVD, as one embodiment of the information recording medium to which the present invention is applied, will be explained with reference to FIG. 1.

Figures 1, 1A:
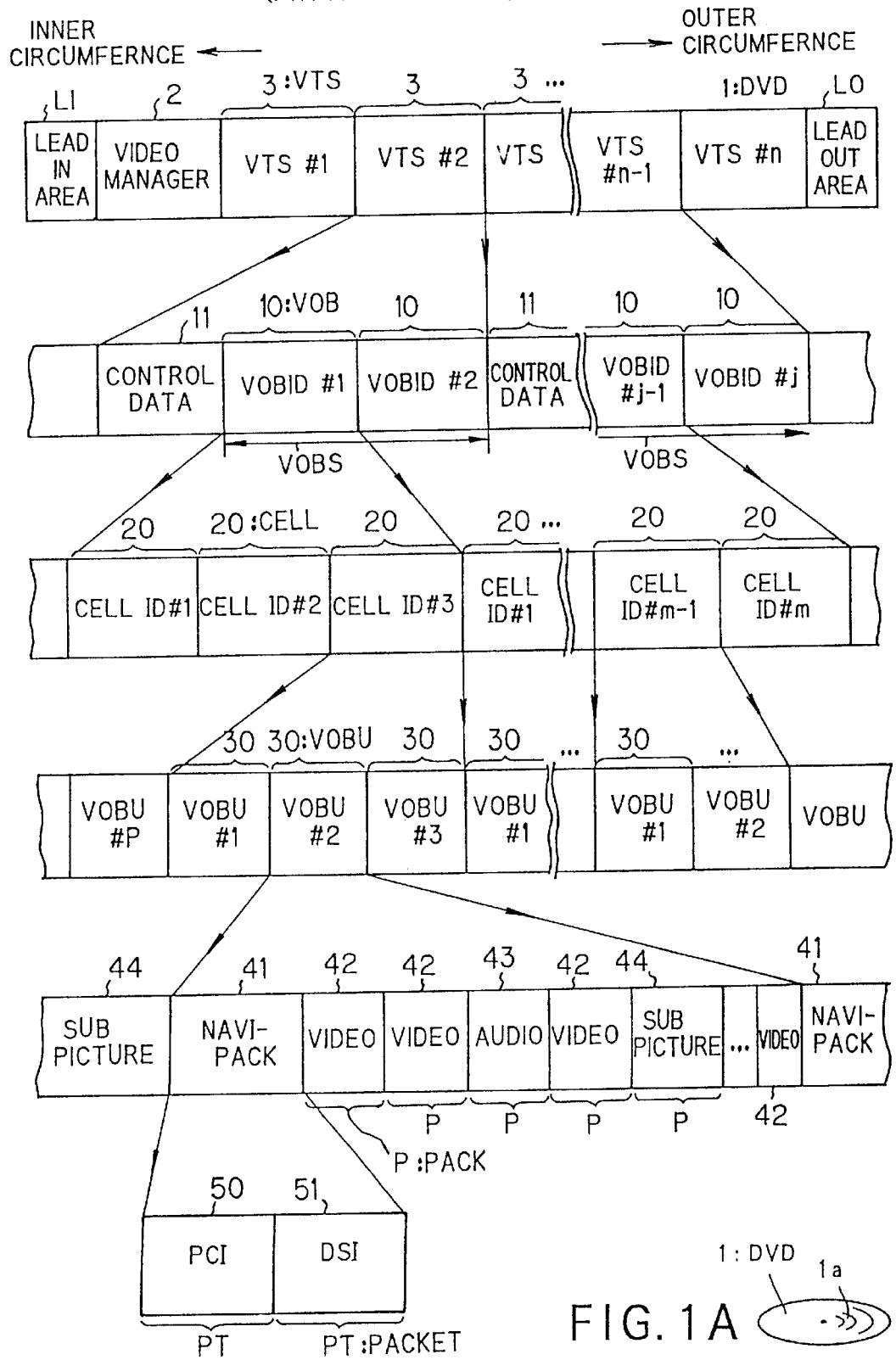
FIGS. 1 and 1A are diagrams showing a physical structure of record information of a DVD as one embodiment of the present invention.

At first, a record format of video information and audio information on the DVD (i.e. a physical record format) is explained by use of FIG. 1.

As shown in FIG. 1, a DVD 1 as the present embodiment is provided with a lead in area LI at its most inner circumferential portion and a lead out area LO at its most outer circumferential portion, between which video information and audio information are recorded such that they are divided into a plurality of VTSs 3, each of which has a unique ID (Identification) number (i.e. VTS#1 to VTS#n). Here, the VTS (Video Title Set) 3 is a set (bundle) of titles (each of which is one production or one work which an author or producer intends to offer to the audience), which are related to each other (e.g., which attribute, such as the number, the specification, the corresponding languages etc. of audio and video streams is the same to each other). More concretely, a plurality of movies which are related to the same movie to each other but which languages of serifs (lines) are different from each other may be recorded as different titles respectively, or even in case of the same movies, the theater version and the special version may be recorded as different titles respectively. Ahead of the area where the VTSs 3 are recorded, a video manager 2 is recorded as shown in FIG. 1. As the information recorded in the video manager 2, for example, information related to the whole video and audio information recorded on the DVD 1, such as a menu for accessing each title, information for preventing an illegal copy, an access table for directly accessing each title and so on, is recorded.

One VTS 3 is recorded such that it is divided into a plurality of VOBs 10, each of which has an ID number (VOB ID#1, VOB ID#2, . . . ), and control data 11 disposed ahead of the VOBs 10. Here, a data portion constructed by a plurality of VOBs 10 is defined as a VOB set (VOBS) as shown in FIG. 1. This VOB set is defined to distinguish the VOB 10, which constructs one portion of the VTS 3 as the substantial portion of the video and audio information, from the control data 11, which constructs another portion of the VTS 3.

In the control data 11 recorded at the head of the VTS 3, information such as PGCI (ProGram Chain Information), which is various information related to a program chain as a logical division obtained by combining a plurality of cells (the "cell" will be described later in detail), is recorded. In each VOB 10, the substantial portion of the video and audio information (i.e. the video and audio information itself other than control information) besides the control information are recorded.

Further, one VOB 10 is constructed of a plurality of cells 20, each of which has an ID number (cell ID#1, cell ID#2, . . . ). Here, one VOB 10 is constructed such that it is completed by the plurality of cells 20 and that one cell 20 does not stride over two VOBs 10.

One cell 20 is constructed of a plurality of VOB units (VOBUs) 30, each of which has an ID number (VOBU#1, VOBU#2, . . . ). Here, the VOB unit 30 is an information unit, each of which includes the video information, the audio information and sub picture information (which is defined as information of a sub picture such as a subtitle of a movie etc.).

One VOB unit 30 is provided with: a navi-pack (a navigation pack) 41 for the control information; a video pack 42 for the video information; an audio pack 43 for the audio information; and a sub picture pack 44 for the sub picture information. Here, in the video pack 42, a packet including the video data is recorded. In the audio pack 43, a packet including the audio data is recorded. Further, in the sub picture pack 44, a packet including graphics such as a character and a diagram as the sub picture, is recorded. In the video packs 42, which data amount is relatively large as shown in FIG. 1, one or a plurality of GOPs (Group Of Pictures) are recorded within one VOB unit 30. The audio pack 43 and the sub picture pack 44 are disposed intermittently between the video packs 42. It is prescribed by a standard specification of the DVD that there are 8 kinds of audio recordable on the DVD 1 while there are 32 kinds of sub picture recordable on the DVD 1.

The data packs are recorded such that the reproduction time of one VOBU 30 (the reproduction time of data recorded between one navi-pack 41 and next navi-pack 41 adjacent thereto) is equal to or longer than 0.4 seconds. Further, there always exists the navi-pack 41 in one VOBU 30. On the other hand, there may not exist each of the video pack 42, the audio pack 43 and the sub picture pack 44 in one VOBU 30, or, even in case that these packs exist in one VOBU 30, the number of the packs and the order of the packs are freely determined.

Finally, the navi-pack 41 is provided with: a DSI (Data Search Information) packet 51 including search information to search a video image or an audio sound desired to be displayed or sound-outputted (concretely, search information such as an address, where the video or audio to be displayed or sound-outputted is recorded, on the DVD 1); and a PCI (Presentation Control Information) packet 50 including information related to a display control at a time of displaying the video image or outputting the audio sound, which is searched on the basis of the information of the DSI packet 51. Further, all video data included in one VOBU 30 consist of at least one GOP (Group Of Pictures). In the PCI packet 50, high light information, which defines a display or operation at a time when one selection item is selected out of selection items by the audience, is included. By the high light information, for example, the change of the picture plane display as well as the display position to be changed with respect to the selection item selected on a special picture plane of selection items (i.e. a so-called menu picture plane) for the audience to select, and the command corresponding to the selected item (i.e. a command to be performed in correspondence with the selected item) are set.

The video information to construct and display a frame, a selection button and the like, which is required to construct and display the menu picture plane, is recorded in the sub picture pack 44 as the sub picture information.

Further, the above described GOP is a minimum picture unit, which can be independently reproduced and which is determined by a standard based on the MPEG (Moving Picture Experts Group) 2 method. The MPEG 2 method is a picture compression method adopted at a time of recording the video information onto the DVD 1 in the present embodiment.

Here, the outline of the MPEG 2 method is explained. Namely, in general, frame pictures forward and backward of one frame picture in continuous frame pictures are often resembled to each other and have mutual relationships. The MPEG 2 method is a method, which is proposed by paying attention to this fact, and which generates one frame picture existing between a plurality of frame pictures on the basis of the plurality of frame pictures transferred while they are timely separated by a few or several frames from each other, by means of an interpolating calculation based on moving vectors etc. of the original picture. In this case, if this one frame picture is to be recorded, it is enough to just record the information as for a differential vector and a moving vector thereof with respect to the plurality of frame pictures, so as to reproduce this one frame picture by estimating it from the plurality of frame pictures with referring to these vectors, at a time of reproduction. By this, the compression recording is enabled with respect to the picture.

Further, the scheme of the above explained GOP is explained with reference to FIG. 2. FIG. 2 shows an example of a plurality of frame pictures constituting one GOP. In FIG. 2, a case where one GOP 52 consists of 12 frame pictures is illustrated (in the MPEG 2 method, the number of the frame pictures included in one GOP 52 is not fixed), for example. Among those frame pictures, a frame picture indicated by a reference sign "I" is referred to as an I picture (Intra-coded picture), which is defined as a frame picture able to be reproduced as a complete frame picture by use of its own picture information. A frame picture indicated by a reference sign "P" is called as a P picture (Predictive-coded picture), which is defined as a frame picture predicted or generated by decoding a difference from a predictive picture compensated and reproduced on the basis of the already decoded I picture or other picture. A frame picture indicated by a reference sign "B" is called as a B picture (Bidirectionally Predictive-coded picture), which is defined as a frame picture predicted or reproduced by use of not only the already decoded I picture or P picture but also the I picture or P picture which is recorded on the optical disk timely in the future relative to the pertinent B picture. In FIG. 2, the relationship in the prediction (i.e. the relationship in the compensation) between the respective pictures are indicated by arrows.

The MPEG 2 method used in the DVD 1 of the present embodiment employs a variable rate method, in which the data amount included in each GOP is not constant. Namely, in case that the respective pictures included in one GOP 52 correspond to a moving picture, which moving speed is rather fast and that the mutual relationship between the respective pictures is relatively small, the data amount constituting the respective pictures is increased, so that the data amount included in one GOP 52 is also increased. On the other hand, in case that the respective pictures included in one GOP 52 correspond to a moving picture which moving speed is rather slow and that the mutual relationship between the respective pictures is relatively large, the data amount constituting the respective pictures is decreased, so that the data amount included in one GOP 52 is also decreased.

In the above explained record format having a hierarchical structure as shown in FIG. 1, each division can be freely set according to the author's intention, so as to perform recording on the basis of these set divisions. By performing the reproduction on the basis of a later described logical structure for each of these divisions, the variegated reproduction can be performed.

A logical format (logical structure) constructed by combining the information recorded by the physical divisions shown in FIG. 1 is explained with reference to FIG. 2. The information is not actually recorded on the DVD 1 in the logical structure of FIG. 2. Instead, information (e.g. access information or time information) to reproduce each data shown in FIG. 1 by combining them (especially combining the cells 20) in the logical structure shown in FIG. 2, is recorded on the DVD 1, especially in the control data 11.

To make the explanation clear, the following explanation is made from the lower hierarchical layer in FIG. 3. One program 60 is logically constructed on the basis of the author's intention by selecting and combining a plurality of cells 20 among the physical structures explained by use of FIG. 1. The program 60 is also a minimum logical unit, which division can be identified by a system controller of a reproducing apparatus described later and which can be accessed by use of a command by the system controller. It is also possible for the author to define a gathering of one or more programs 60 as a minimum unit, which can be freely selected to be watched or listened to by the audience and which is referred to as a PTT (ParT Of Title).

Since one program 60 is logically constructed by selecting a plurality of cells 20, it is possible to use one cell commonly for a plurality of programs 60, namely to perform a so-called "alternative usage" of the cell 20 in which one cell 20 is reproduced in a plurality of different programs 60.

Here, as for the number of each cell 20, at a time of treating the cell 20 on the physical format shown in FIG. 1, the number is treated as the cell ID number (which is indicated by cell ID # in FIG. 1). On the other hand, at a time of treating the cell 20 on the logical format shown in FIG. 2, the number is treated as the cell number in the order of description in the PGCI described later.

Next, by combining a plurality of programs 60, one PGC (Program Chain) 61 is logically constructed on the basis of the author's intention. The aforementioned PGCI (ProGram Chain Information) is defined by a unit of the PGC 61. The PGCI includes information indicating: the reproduction order for each program 60 at a time of reproducing each program 60 (by this reproduction order, a unique program number (#1, #2, . . . ) is assigned to each program 60); the reproduction order for each cell 20 (by this reproduction order, a unique cell number is assigned to each cell 20); an address which is a record position of each cell 20 on the DVD 1; the number of the cell 20 positioned at the head of one program 60 to be firstly reproduced; a reproduction method for each program 60 [it is possible for the author to select one reproduction method out of (i) a random reproduction (which is a random reproduction by use of random numbers, and the same program 60 may be reproduced by a plurality of times), (ii) a shuffle reproduction (which is a random reproduction by use of random numbers in the same manner as the random reproduction, but one program 60 is reproduced just once but not reproduced by a plurality of times), (iii) a loop reproduction (which is a reproduction to reproduce one PGC 61 repeatedly), and (iv) a combination of the loop reproduction with the random reproduction or the shuffle reproduction, as a reproduction method to be employed at a time of reproduction]; and various commands (e.g. commands able to be specified by the author for each PGC 61 or each cell 20). The recording position of the PGCI on the DVD 1 may be in the control data 11 as aforementioned, or in a control data (not illustrated) in the video manager 2 if the pertinent PGCI is related to the menu in the video manager 2 (refer to FIG. 1).

In one PGC 61, the substantial video and audio data etc. are included as a combination of the programs 60 (in other words, the combination of the cells 20) other than the above mentioned PGCI.

Further, in one PGC 61, it is possible to perform the alternative usage of the cell 20 as explained before in the explanation for the program 60 (i.e. such a usage that the same cell 20 is commonly used by a plurality of different PGC 61). As the method of reproducing the cell 20 to be used, the author can select a method of reproducing the cells 20 in an order regardless of the recording order on the DVD 1 (i.e. the method of reproducing the cells discontinuously arranged, for example, the method of reproducing the cell 20 prior which is recorded posterior on the record track) other than a method of reproducing the cell 20 in the recording order on the record track on the DVD 1 as it is (i.e. the method of reproducing the cells continuously arranged).

Then, one title 62 is logically constructed of one or a plurality of PGCs 61 (PGC #1, PGC#2, . . . ) as shown in FIG. 3. The title 62 is, for example, a unit corresponding to one movie, and is completed information which the author would like to offer to the audience of the DVD 1.

Finally, one VTS 63 is logically constructed of one or a plurality of titles 62 (title #1, title #2, . . . ) as shown in FIG. 3. The title 62 included in the VTS 63 has the attributes common to each other. For example, the movies based on one movie but in different languages correspond to the respective titles 62. The information included in one VTS 63 shown in FIG. 3 corresponds to information included in one VTS 3 shown in FIG. 1. Namely, all information included in the logical VTS 63 shown in FIG. 3 is recorded as one VTS 3 in the DVD 1 shown in FIG. 1.

As the author specifies the information divided in the physical structure on the DVD 1 on the basis of the above described logical format, the video image (e.g. the movie image) for the audience to watch is to be formed.

In the explanations for the physical structure shown in FIG. 1, for the easy understanding of the content, it has been explained such that a plurality of cells 20 are recorded in the order of the ID numbers. However, in the DVD 1 of the present embodiment, one cell 20 may be divided into a plurality of interleaved units IU to be actually recorded on the DVD 1, as shown in FIG. 4.

Figure 4:
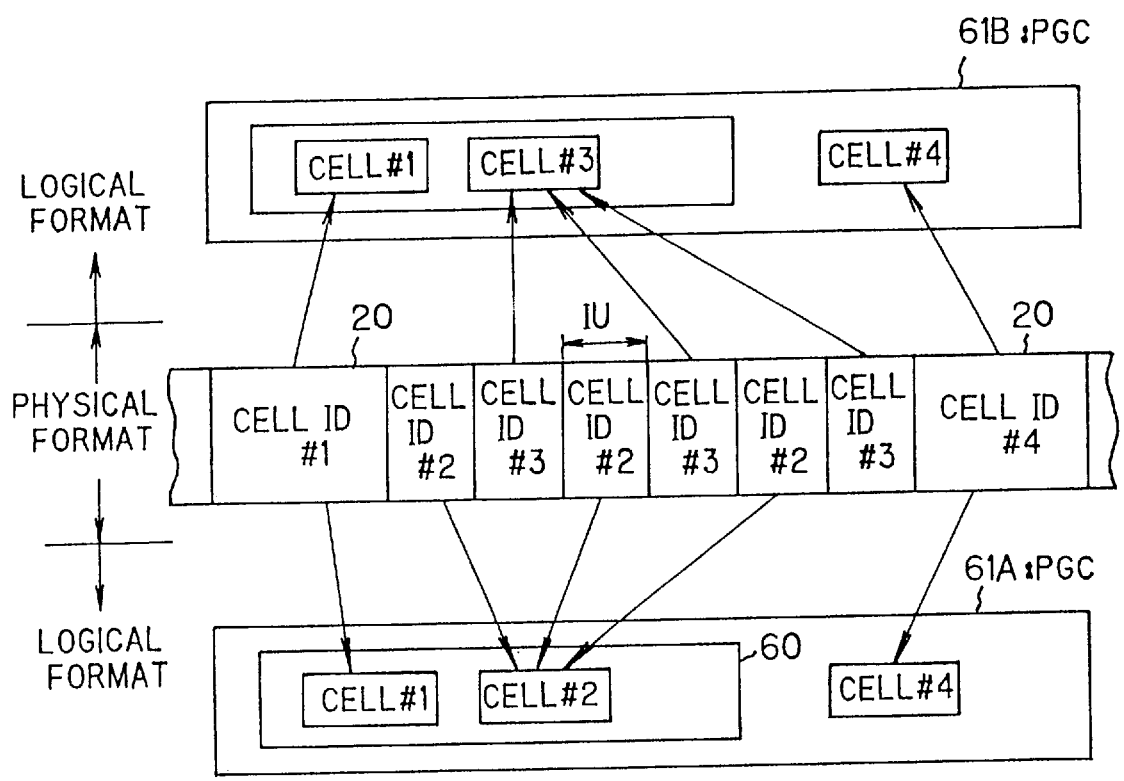
FIG. 4 is a diagram showing a structure of an interleaved unit of the DVD in FIG. 1.

Namely, as shown in FIG. 4, it is assumed that the author constructs one PGC 61A of the cells 20 having the ID numbers 1, 2 and 4, and constructs another PGC 61B of the cells 20 having the ID numbers 1, 3 and 4. In this case, at a time of reproducing the information from the DVD 1 on the basis of the PGC 61A, only the cells having the ID numbers 1, 2 and 4 are reproduced, while, at a time of reproducing the information from the DVD 1 on the basis of the PGC 61B, only the cells 20 having the ID numbers 1, 3 and 4 are reproduced. In the case of the PGC 61A for example, if the cells 20 are recorded spaced from each other for each ID number, a certain time period to jump the optical pickup from the record position of the cell 20 having the ID number 2 on the DVD 1 to the record position of the cell 20 having the ID number 4 on the DVD 1 is required in the reproduction. This results in that the continuous reproduction (hereinafter, it is referred to as a "seamless reproduction") of the cell 20 having the ID number 2 and the cell 20 having the ID number 4 may not be possible depending on a capacity of a track buffer of the reproducing apparatus described later.

Therefore, in the case shown in FIG. 4, the cell 20 having the ID number 2 and the cell having the ID number 3 are divided into interleaved units IU and are recorded by the interleaved units IU, each having a length, which does not destroy the continuity of an output signal of the track buffer even if an input signal to the track buffer is temporarily stopped, in correspondence with an input and output processing speeds at the track buffer (i.e. the interleaved units IU, each having a length which allows the track buffer to continuously output the output signal even if the input signal to the track buffer is ceased while the optical pickup jumps for the interval of one interleaved unit IU). For example, in case of reproduction based on the PGC 61A, only the interleaved units IU constructing the cell 20 corresponding to the ID number 2 are continuously detected to be reproduced. In the same manner, in case of reproduction based on the PGC 61B, only the interleaved units IU constructing the cell 20 corresponding to the ID number 3 are continuously detected to be reproduced. The length of the interleaved unit IU may be determined with considering the capability of a driving mechanism such as a slider motor to perform the track jump, in addition to the memory capacity of the track buffer.

In this manner, by dividing one cell 20 into a plurality of interleaved units IU and recording them according to the author's intention, the signal outputted from the track buffer can be continuous even at a time of reproducing the PGC 61 including the cells 20 having the discontinuous ID numbers, so that it is possible for the audience to watch continuous reproduction video image.

Each interleaved unit IU is completed in one VOB 10, and does not stride over two adjacent VOBs 10. As for the relationship between the interleaved unit IU and the VOB unit 30, one or a plurality of VOB units 30 are included in one interleaved unit IU. One VOB unit 30 is completed in one interleaved unit IU, and is not divided into a plurality of interleaved units IU or does not strides over a plurality of interleaved units IU.

Next, out of the video information and the audio information having the physical and logical structures described above, parental management table and parental ID, which constitute the characteristic feature of the present invention, will be described.

FIG. 5 shows the correspondence between the parental levels in United States and Japan for the VTS and title parental IDs. The parental level is a kind of permission level for the viewers who watch the contents of the recorded information. In Japan, there are two parental levels, i.e., the adult contents level for inspection of movie (Over eighteen (O18)) and the general level (Under seventeen (U17)) are set, and in the United States six levels, i.e., X, R, NC17, PG13, PG, and G, are set. Now, it is assumed, as shown in FIG. 5, that a DVD available in both the United Stated and Japan has a VTS which includes five titles T1 to T5, and each title, T1, T2, T3, T4 and T5 has the title parental IDs "5", "0", "4", "3" and "5" with respect to the U.S. and Japanese parental levels. It is noted that the title parental ID is a parental ID which is applied to the title. Since the U.S. parental level and the Japanese parental level are different from each other, the titles T2, T3 and T4 which fall within the Japanese parental level U17 belong to different U.S. parental levels.

FIG. 6 shows an example of a parental management table (a chart showing the correspondence of the parental level and title parental IDs) PTM which is produced based on the correspondence shown in FIG. 5 and FIG. 7 shows examples of the title parental IDs.

As shown in FIG. 6, each parental level (LVL#) has seven ID designation places for parental IDs in each of which the ID number of the title parental ID permitted to be reproduced at the respective parental levels (LVL#1–6) are described by the digit (flag) "1". Namely, the parental ID is expressed by the ID numbers to which the flag "1" is applied. For example, the parental IDs corresponding to the parental level LVL#1 of United States (see. FIG. 6) are "5", "4", "3", and "0". When the parental level 1 (LVL#1) is selected, all titles which reproduction is permitted at the parental level 2 to 6 (LVL#2 to LVL#6) are permitted to be reproduced. In the embodiment, the parental management tables are recorded together (i.e., all tables are recorded) in the volume information file in the video manager 2 as a parental management information table (PINF). However, the parental management tables may be recorded together in an arbitrary position.

Each title parental ID shown in FIG. 7 is expressed by putting the flag "1" to the corresponding ID number (designation place). For example, as for the title T1, since the title parental ID is "5", the title T1 can be reproduced by a DVD player whose parental level is set to one of the U.S. parental levels LVL#1 and LVL#2 or the Japanese parental level LVL#1. In the embodiment, the title parental IDs are recorded in the information table in the title. However, they may be recorded at arbitrary positions on the disk. For example, they may be described in the access table for accessing to the titles in the video manager 2. As described above, the parental-related information for the countries is not described with the title and only the parental IDs for identification are described. Therefore, the storage capacity necessary to store the parental-related information such as the parental levels can be reduced.

As shown in FIGS. 6 and 7, when the parental management table and the title parental IDs are recorded, the reproducing apparatus reads out the parental ID (IDA) corresponding to the selected parental level (LVL#) from the parental management table in the disk and reads out the parental IDs (IDB) of the chosen title from the disk. Then, the reproducing apparatus reproduces the chosen title if the parental IDs IDB are included in the parental IDs IDA. Therefore, an identical disk can be reproduced according to the different parental levels of different countries.

Figure 8:
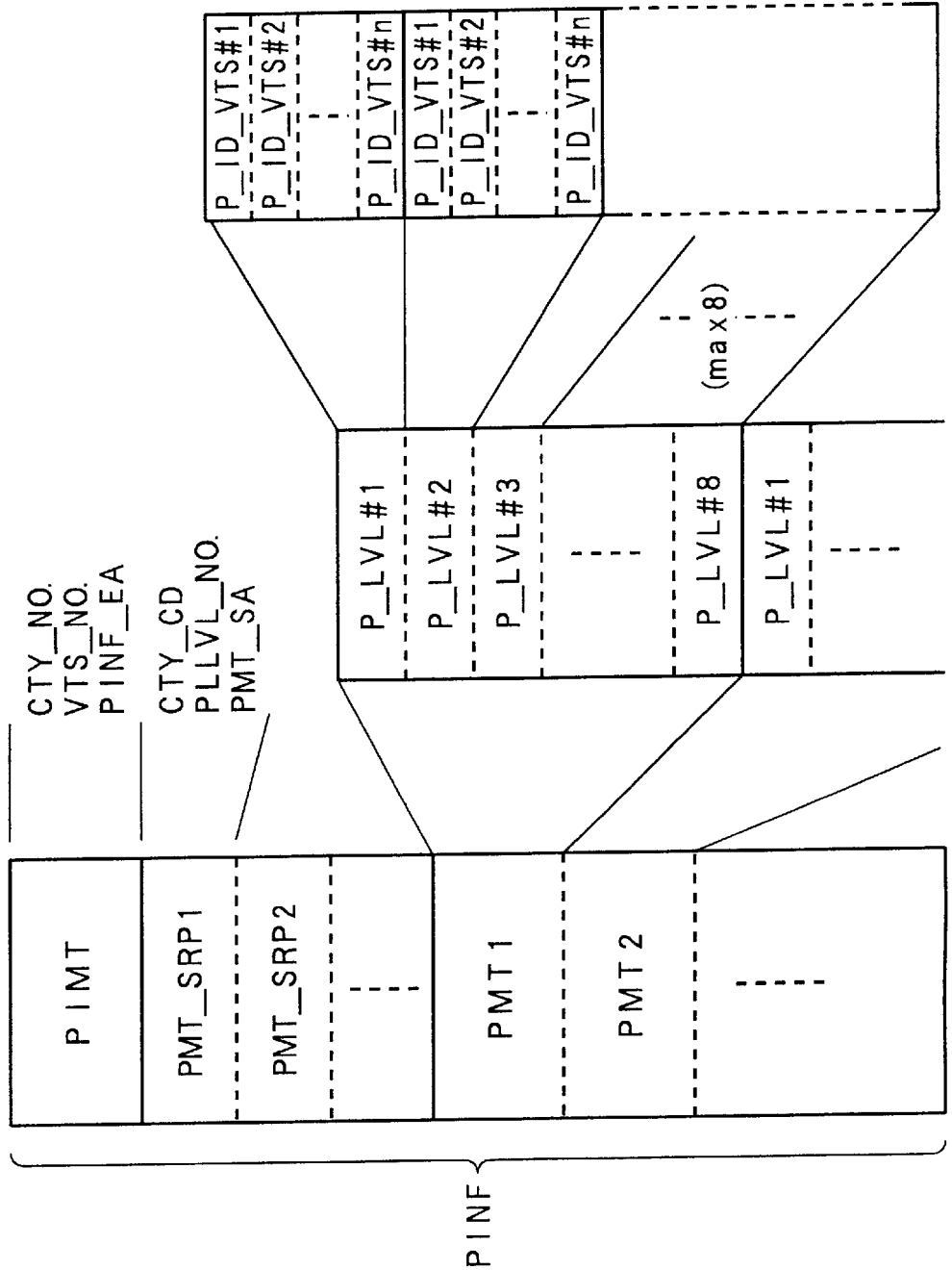
FIG. 8 is a diagram illustrating an example of parental management information table actually recorded in a video manager.

FIG. 8 shows an example of the parental management information table (PINF) actually recorded in the video manager 2. The parental management information table PINF shown in FIG. 8 includes the management table (PIMT) of the parental management information table PINF, a plurality of parental management table search pointers (PMT_SRP) and a plurality of parental management information tables (PMT).

The management table PIMT includes a number of the countries (CTY_NO.) for which the parental-related information is recorded in the disk, a number of the VTSs (VTS_NO.) recorded in the disk and an end address (PINF_EA) of the parental management information table PINF. In addition, each parental management table search pointer PMT_SRP includes country codes (CTY_CD), a number of the parental levels defined in the country (P_LVL_NO.) and a start address (PMT_SA) of the parental management table PMT corresponding to it.

Each parental management table PMT may include a plurality of parental tables, up to 8 tables at maximum, for each country. Each parental level (P_LVL) in the parental management table PMT includes one or more parental ID tables (P_ID_VTS_No.) for each VTS. The parental management table PMT shown in FIG. 6 is an example of the parental management table PMT recorded in the parental management information table PINF in a case where the parental information of only two countries, the United States and Japan, are recorded on the disk and a single VTS (VTS#1) comprised of five titles T1 to T5 is recorded on the disk.

The title parental IDs may be recorded in the title search pointer (TT_SRP) of the video manager 2 as described above, and in that case the parental IDs PTL_ID of the PGC in the title are all set to "1".

(A) First Embodiment

Figures 9, 10:
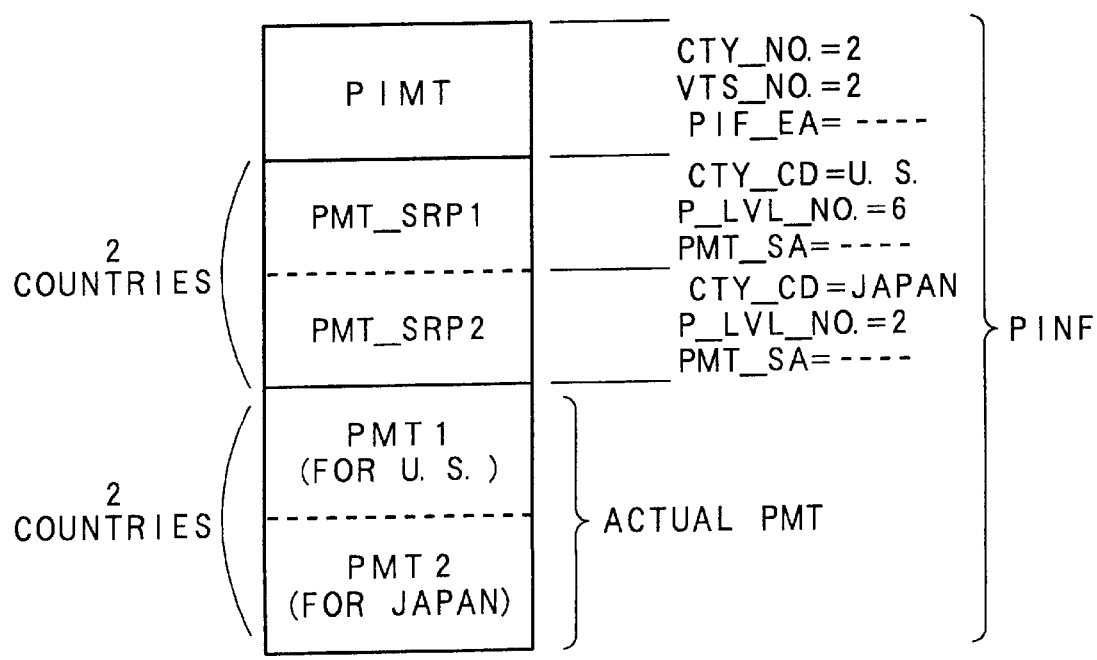
FIG. 9 is a diagram illustrating an example of parental IDs set for Video Title Set.
FIG. 10 is a diagram illustrating an example of parental management information table (PINF)

Next, by referring to FIGS. 9 to 12, a description will be given of an example in which the disk has two VTSs each of which includes three titles and each title includes one PGC. As shown in FIG. 9, the VTS#1 includes three titles T1, T2 and T3, and the VTS#2 includes three titles T4, T5 and T6. Like the case of FIG. 5, it is assumed that the Japanese parental levels have two levels, i.e., for adult (O18) and for general people (U17), and the U.S. parental levels have six levels, i.e., X, R, NC17, PG13, PG and G. Assuming that the parental IDs (PGC parental ID) of the titles T1, T2, T3, T4, T5 and T6 are "3", "1", "5", "3", "2" and "4", respectively, the parental management information table PINF becomes as shown in FIG. 10.

The parental management information table PINF shown in FIG. 10 includes the management table PIMT, the parental management table search pointers PMT_SRP for two countries (U.S. and Japan), and the parental management tables PMT for two countries.

The management table PIMT includes the number of the countries for which parental-related information is recorded in the disk (CTY_No.=2), the number of the VTSs recorded in the disk (VTS_No.=2), and the end addresses PINF_EA of the parental management information tables. Each parental management table search pointer PMT_SRP includes the country codes CTY_CD and the number of the parental levels PLT_LVL_NO. (six for U.S. and two for Japan).

The contents of the parental management table PMT is as shown in FIG. 11 (see the portion "ACTUAL PMT"). In FIG. 11, the arrows shows the portions having the same contents.

In the first embodiment, since the number of PGC is one, as for the title search pointer TT_SRP, the parental ID PTL_ID s are as shown in FIG. 12A. Therefore, assuming that the DVD player is set to the parental level of P_LVL#4 (PG13) in United States, considering FIGS. 11 and 12a, it is recognized that only the titles T1 and T2 can be reproduced in the VTS#1 and only the title T4 can be reproduced in the VTS#2.

(B) Second Embodiment

Next, by referring to FIGS. 13 and 14, the description will be given of the example in which one title includes two PGCs and the titles have three U.S. parental levels (three IDs).

Figure 13:
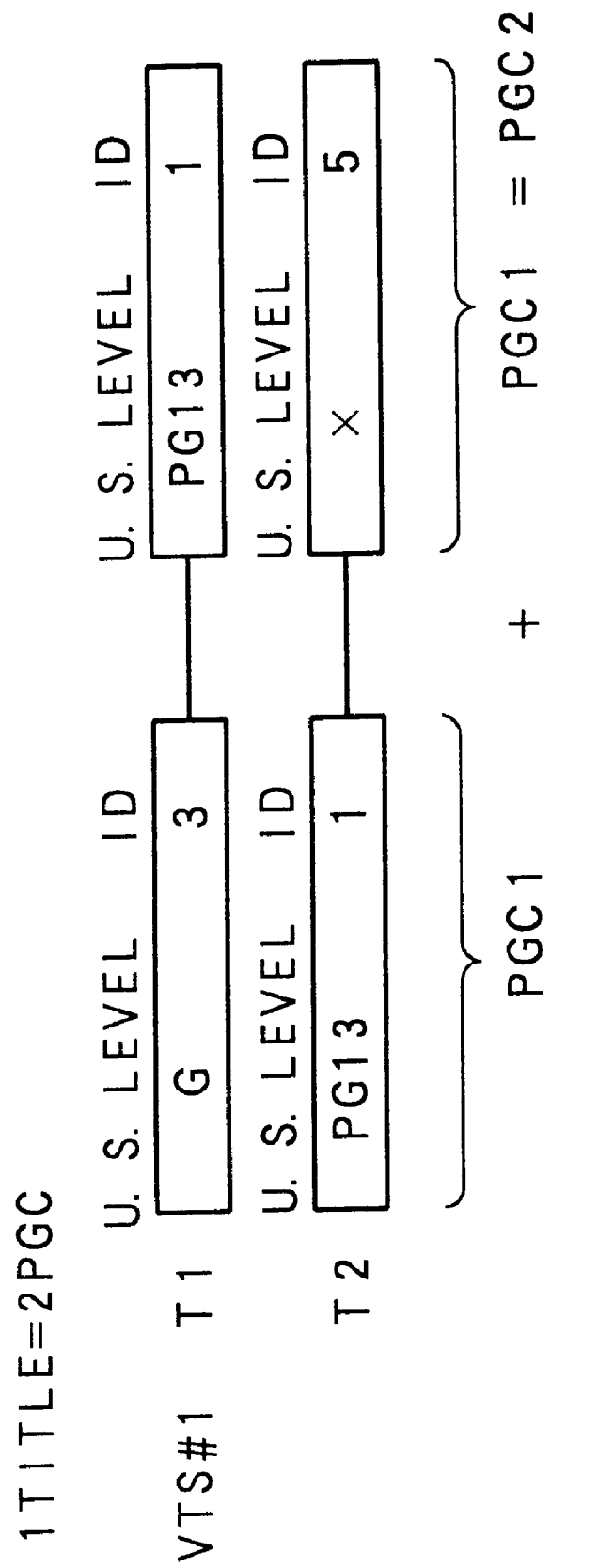
FIG. 13 is a diagram illustrating an example of parental IDs set for Video Title Set.

As shown in FIG. 13, the VTS#1 includes two titles, T1 and T2. The first PGC of the title T1 has the parental ID=3, and the second PGC of the title T1 has the parental ID=1. The first PGC of the title T2 has the parental ID=1, and the second PGC of the title T2 has the parental ID=5.

When the parental IDs are determined in this manner, the parental management table PMT becomes as shown in FIG. 14A. Namely, in the case of the parental level P_LVL#1, the flag "1" is described at the ID numbers 1, 3 and 5, in the case of the parental level P_LVL#2 to P_LVL#4 (case B), the flag "1" is described at the ID numbers 1 and 3, and in the case of the parental level P_LVL#5 and P_LVL#6 (case C), the flag "1" is described at the ID number 3.

The parental ID PLT_ID in the title search pointer TT_SRP in the VTS#1 becomes as shown in FIG. 14B. Namely, in the title T1, the flag "1" is described at the ID numbers 1 and 3, and in the title T2, the flag "1" is described at the ID numbers 1 and 5.

In the case of the DVD player which is set to the U.S. parental level P_LVL#2 (R), as shown in FIG. 14C, it is recognized from the parental management table PMT shown in FIG. 14A that the title having the title parental ID which flags at the ID numbers 1 or 3 can be reproduced. Accordingly, the DVD player can reproduce the title T1 because the flags of the parental ID of the U.S. level P_LVL#2 at the ID numbers 1 and 3 are "1". However, the DVD player cannot reproduced the title T2 because the flag of the title parental ID at the ID number 5 is "1", which is not included in the parental IDs of the U.S. parental level P_LVL#2.

By introducing the parental IDs to the parental levels, the storage capability of the table which stores parental-related information for different countries may be reduced. In addition, by recording the tables together on an identical recording position on the disk, the necessary storage capacity may be reduced. Further, authors in each country can arbitrarily apply the parental ID without limitation, the change of the level can be readily conducted.

Since the DVD has a sufficient storage capacity, not only for recording a movie but also subtitles in various different languages for the movie, the above described format can be effectively applied to DVD.

(II) Embodiment of Recording Apparatus

Next, an embodiment of recording apparatus for recording the above mentioned control information, video information and audio information onto the DVD 1 will be explained with reference to FIG. 15.

At first, a construction and an operation of the recording apparatus as the embodiment is explained with reference to FIG. 15.

Figure 15:
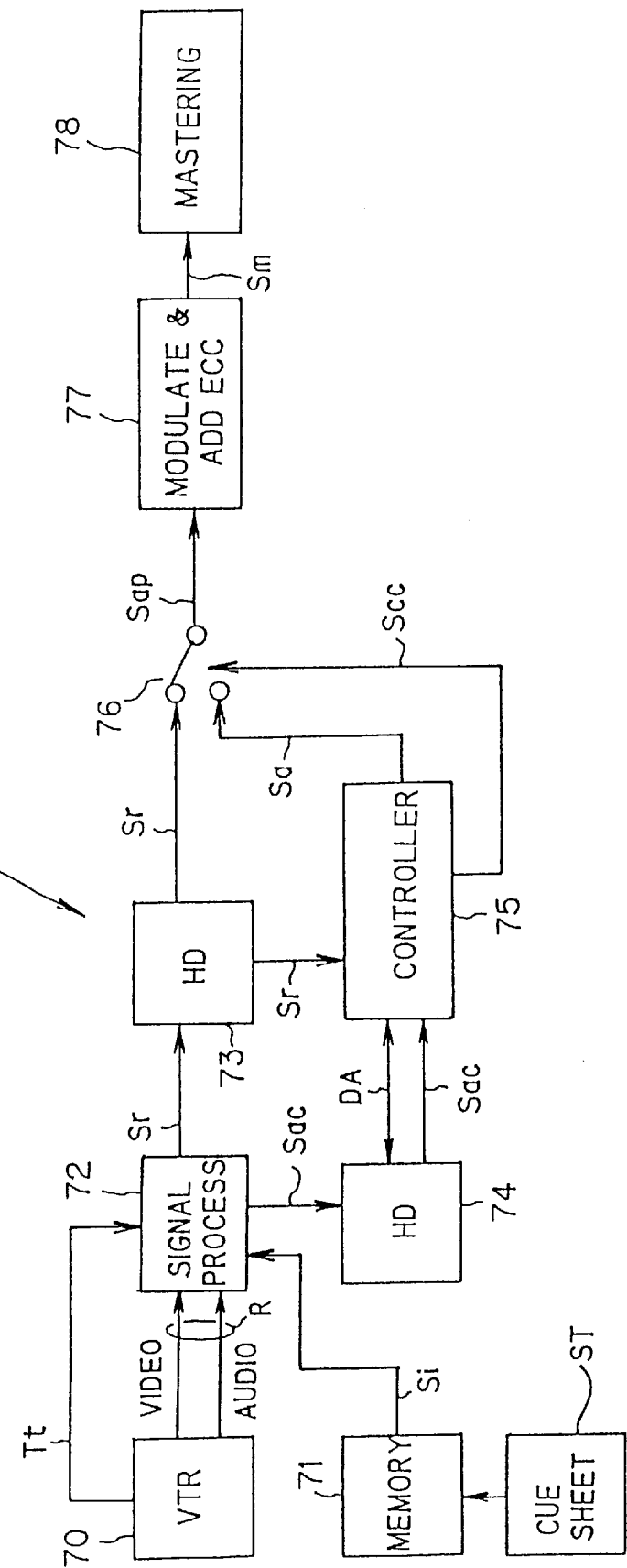
FIG. 15 is a block diagram of an information recording apparatus for recording the DVD in FIG. 1, as another embodiment of the present invention.

As shown in FIG. 15, a recording apparatus S1 as the present embodiment is provided with: a VTR (Video Tape Recorder) 70; a memory 71; a signal process unit 72; a hard disk (HD) device 73; a hard disk (HD) device 74; a controller 75; a multiplexer 76; a modulator 77; and a mastering device 78.

An operation of the present embodiment is explained.

Record information R, which is a raw material such as audio information, video information etc. to be recorded on the DVD 1, is temporarily recorded in the VTR 70. Then, the recorded information R temporarily record in the VTR 70 is outputted to the signal process unit 72 by a request from the signal process unit 72.

The signal process unit 72 applies an A/D (Analog to Digital) converting process and a signal compressing process to the record information R outputted from the VTR 70, and time-axis-multiplexes the audio information and the video information to output it as a compressed multiplexed signal Sr. After that, the compressed multiplexed signal Sr outputted therefrom is temporarily stored into the hard disk device 73.

Along with this, the memory 71 classifies the record information R into a plurality of partial record information Pr in advance, and temporarily stores content information related to the partial record information Pr which is inputted beforehand on the basis of a cue sheet ST, on which parental management tables and title parental IDs are written. Then, the memory 71 outputs it as a content information signal Si on the basis of a request from the signal process unit 72.

Then, the signal process unit 72 generates and outputs an access information signal Sac corresponding to the partial record information Pr with referring to a time code Tt, on the basis of the time code Tt corresponding to the record information R outputted from the VTR 70 and the content information signal Si outputted from the memory 71. Then, the access information signal Sac is temporarily stored in the hard disk device 74.

The above described processes are performed with respect to the whole record information R.

When the above described processes are finished as for the whole record information R, the controller 75 reads out the compressed multiplexed signal Sr from the hard disk device 73, reads out the access information signal Sac from the hard disk device 74, generates additional information DA on the basis of these read out signals, and stores the additional information DA into the hard disk device 74. This is because there may be a control signal, which content is determined in dependence upon a generation result of the compressed multiplexed signal Sr among various control signals. On the other hand, the controller 75 performs a time management for each of the operations of the signal process unit 72, the hard disk device 73 and the hard disk device 74, and reads out the additional information DA from the hard disk device 74, so that the controller 75 generates and outputs an additional information signal Sa corresponding to the read out additional information DA, and generates and outputs an information selection signal Scc to time-axis-multiplex the compressed multiplexed signal Sr and the additional information signal Sa.

After that, the compressed multiplexed signal Sr and the additional information signal Sa are time-axis-multiplexed by the multiplexer 76 to be outputted as an information added compressed multiplexed Sap. If there exists the sub picture information to be recorded, it is inputted, by other means such as a hard disk device not illustrated, to the signal process unit 72, so that it is processed in the same manner as the video and audio information thereat.

Then, the modulator 77 adds an error correction code (ECC), such as a Reed Solomon code, and applies a modulation such as an eight to sixteen (8–16) modulation with respect to the information added compressed multiplexed signal Sap outputted from the multiplexer 76, and generates and outputs a disk record signal Sm to the mastering device 78.

Finally, the mastering device 78 records the disk record signal Sm to a stamper disk, which becomes a master (i.e. a cutting dye) for the production of an optical disk. Then, by use of this stamper disk, an optical disk as a replica disk, which can be on sale in the general market, i.e. the DVD 1, can be produced by a replication device not illustrated.

Next, the recording operation of the parental management table and the title parental IDs, which is the characteristic feature of the present invention, based on the additional information DA by the recording apparatus S1 will be described.

First, the controller 75 outputs the information selection signal Scc instructing to select the additional information Sa at the timing corresponding to the access information signal Sac. The access information signal Sac is generated on the basis of the contents information Si which designates the parental management tables and the title parental IDs inputted from the cue sheet ST. Then, the multiplexer 76 is switched to the side of the additional information signal Sa. The parental management tables and the title parental IDs are inputted to the modulator 77 as a part of the additional information Sa constituting the video manager 2, and then inputted to the mastering device 78 as a part of the disk recording signal Sm.

As a result, according to this embodiment, the master disk on which the parental management tables and the title parental IDs are recorded at the video manager 2 is produced. Namely, the parental management tables and the title parental IDs are recorded by the recording apparatus S1 in the video manager 2 in the format described in the embodiment of the recording medium. It is noted that other control information are also recorded in the same manner from the cue sheet ST.

(III) Embodiment of Reproducing Apparatus

Next, an embodiment of reproducing apparatus for reproducing the information recorded on the DVD 1 by the above mentioned recording apparatus will be explained with reference to FIGS. 16 to 17.

At first, a construction and an operation of the reproducing apparatus as the embodiment is explained with reference to FIG. 16.

Figure 16:
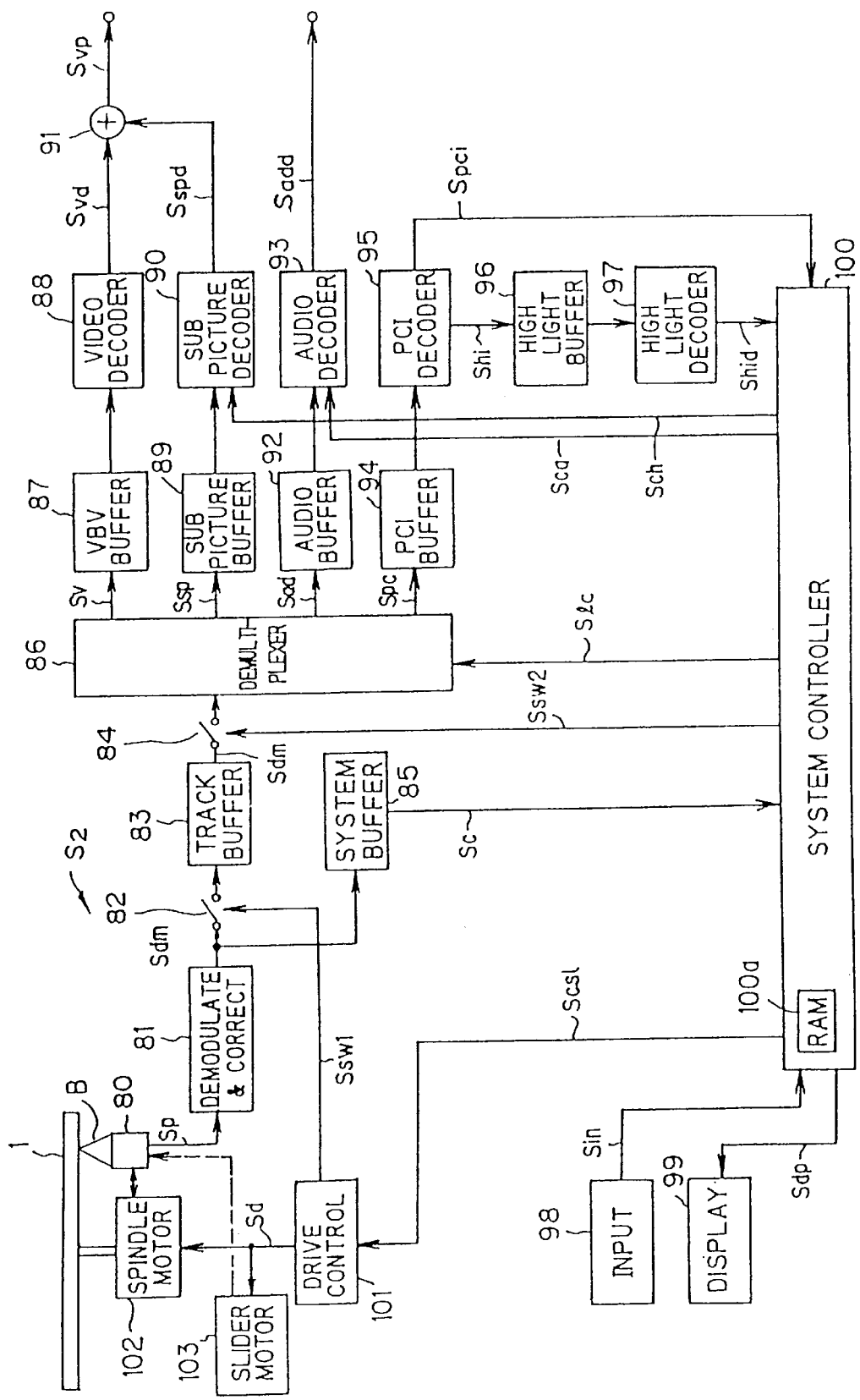
FIG. 16 is a block diagram of an information reproducing apparatus for reproducing the DVD in FIG. 1, as another embodiment of the present invention.

As shown in FIG. 16, a reproducing apparatus S2 as the present embodiment is provided with: an optical pickup 80; a demodulate and correct unit 81; stream switches 82 and 84; a track buffer 83; a system buffer 85; a demultiplexer 86; a VBV (Video Buffer Verifier) buffer 87; a video decoder 88; a sub picture buffer 89; a sub picture decoder 90; a mixer 91; an audio buffer 92; an audio decoder 93; a PCI (Presentation Control Information) buffer 94; a PCI decoder 95; a high light buffer 96; a high light decoder 97; an input unit 98; a display unit 99; a system controller 100; a drive controller 101; a spindle motor 102; and a slider motor 103. The construction shown in FIG. 9 only illustrates the portions related to the video and audio reproduction of the reproducing apparatus S2. The description and the detailed explanation as for servo circuits to servo-control the optical pickup 80, the spindle motor 102, the slider motor 103 and the like are omitted since they are constructed in the same manner as in the conventional arts.

An overall operation of the present embodiment is explained.

The optical pickup 80 includes a laser diode, a polarization beam splitter, an objective lens, a photo-detector and the like not illustrated, and irradiates a light beam B as a reproduction light with respect to the DVD 1. The optical pickup 80 receives a reflection light of the light beam B from the DVD 1, and outputs a detection signal Sp corresponding to information pits formed on the DVD 1. At this time, the tracking servo control and the focus servo control are operated with respect to the objective lens etc. of the optical pickup 80 in the same manner as the conventional art so that the light beam B can be irradiated precisely onto the information track of the DVD 1 and that the light beam B can be focused on the information record surface of the DVD 1.

The detection signal Sp outputted from the optical pickup 80 is inputted to the demodulate and correct unit 81, where a signal demodulation process and an error correct process are applied to it to generate a demodulation signal Sdm, which is outputted to the stream switch 82 and the system buffer 85.

The opening and closing operation of the stream switch 82, to which the demodulation signal Sdm is inputted, is controlled by a switch signal Ssw1 from the drive controller 101. When it is closed, the stream switch 82 passes therethrough the inputted demodulation signal Sdm as it is to the track buffer 83. When it is opened, the demodulation signal Sdm is not outputted therethrough, so that unnecessary or useless information (signal) is not inputted to the track buffer 83.

The track buffer 83, to which the demodulation signal Sdm is inputted, consists of a FIFO (First In First Out) memory, for example. The track buffer 83 temporarily stores the inputted demodulation signal Sdm, and continuously outputs the stored demodulation signal Sdm when the stream switch 84 is closed. The track buffer 83 compensates a difference or fluctuation in the data amount between respective GOP under the MEPG 2 method, and continuously outputs the demodulation signal Sdm, which is discontinuously inputted due to a track jump in the aforementioned seamless reproduction, in case of reading the data divided into the interleaved units IU, so as to avoid the interruption of the reproduction due to the discontinuity.

The opening and closing operation of the stream switch 84, to which the demodulation signal Sdm is continuously inputted, is controlled by a switch signal Ssw2 from the system controller 100 such that the various buffers at its posterior stage may not be over-flown or, on the contrary, may not become empty to stop the decoding process, in the separating process by the demultiplexer 86.

On the other hand, the system buffer 85, to which the demodulation signal Sdm is inputted in parallel with the track buffer 83, accumulates the video manager 2, the control data 11 of the VTS 3 and the like (refer to FIG. 1) which are detected firstly upon loading the DVD 1 and which are related to the whole information recorded on the DVD 1. Then, the system buffer 85 outputs the accumulated data as a control information Sc to the system controller 100, and temporarily stores the DSI packet 51 for each navi-pack 41 (refer to FIG. 1) as the occasion demands while reproducing the information, to output it also as the control information Sc.

The demultiplexer 86, to which the demodulation signal Sdm is continuously inputted through the stream switch 84, separates the video information, the audio information, the sub picture information and the PCI packet 50 for each navi-pack 41 respectively from the inputted demodulation signal Sdm, and outputs them as a video signal Sv, a sub picture signal Ssp, an audio signal Sad and a PCI signal Spc respectively to the VBV buffer 87, the sub picture buffer 89, the audio buffer 92 and the PCI buffer 94. There may be a case where, in the demodulation signal Sdm, different streams of the audio information or the sub picture information in a plurality of different languages are included as the audio or sub picture information. In that case, a desirable language is selected for the audio or sub picture information by a stream selection signal Slc from the system controller 100, so that the audio or sub picture information in the desirable language is outputted to the audio buffer 92 or the sub picture buffer 89.

The VBV buffer 87, to which the video signal Sv is inputted, consists of a FIFO memory, for example. The VBV buffer 87 temporarily stores the video signal Sv and outputs it to the video decoder 88. The VBV buffer 87 compensates the difference or fluctuation in the data amount between respective pictures of the video signal Sv compressed by the MPEG 2 method. Then, the video signal Sv in which the differences in the data amount are compensated, is outputted to the video decoder 88, and is decoded by the MPEG 2 method to be outputted as a decoded video signal Svd to the mixer 91.

On the other hand, the sub picture buffer 89, to which the sub picture signal Ssp is inputted, temporarily stores the inputted sub picture signal Ssp, and outputs it to the sub picture decoder 90. The sub picture buffer 89 is to synchronize the sub picture information included in the sub picture signal Ssp with the video information corresponding to the sub picture information, and to output it. Then, the sub picture signal Ssp synchronized with the video information is inputted to the sub picture decoder 90 and is decoded to be outputted as a decoded sub picture signal Sspd to the mixer 91.

In a case where the sub picture signal Ssp includes video information to construct a frame, a selection button etc. for displaying the menu picture plane, the sub picture decoder 90 changes a display condition of the selection button etc. to be displayed, in the sub picture signal Sspd on the basis of a high light control information Sch from the system controller 100 to output it.

The decoded video signal Svd outputted from the video decoder 88 and the decoded sub picture signal Sspd outputted from the sub picture decoder 90 (which is in synchronization with the corresponding decoded video signal Svd) are mixed together by the mixer 91, and are outputted as a final video signal Svp to be displayed to a display device such as a CRT (Cathode Ray Tube) device not illustrated.

The audio buffer 92, to which the audio signal Sad is inputted, consists of a FIFO memory, for example. The audio buffer 92 temporarily stores the audio signal Sad and outputs it to the audio decoder 93. The audio buffer 92 is to synchronize the audio signal Sad with the video signal Sv or the sub picture signal Ssp including the corresponding video information, and delays the audio signal Sad in accordance with the output condition of the corresponding video information. Then, the audio signal Sad, which is time-adjusted to synchronize with the corresponding video information, is outputted to the audio decoder 93. Then, a predetermined decoding process is applied thereto to the audio signal Sad, and it is outputted as a decoded audio signal Sadd to a speaker etc. not illustrated. If it is detected by the system controller 100 that it is necessary to temporarily stop (pause) the audio voice in the reproduction immediately after accessing, a pause signal Sca is outputted from the system controller 100 to the audio decoder 93, SO that the output of the decoded audio signal Sadd is stopped temporarily at the audio decoder 93.

The PCI buffer 94, to which the PCI signal Spc is inputted, consists of a FIFO memory, for example. The PCI buffer 94 temporarily stores the inputted PCI signal Spc and outputs it to the PCI decoder 95. The PCI buffer 94 is to synchronize the PCI packet 50, which is included in the PCI signal Spc, with the video information, the audio information and the sub picture information corresponding to the PCI packet 50, and apply the PCI packet 50 to the video information and the like. Then, from the PCI signal Spc, which is synchronized with the corresponding the video information and the like by the PCI buffer 94, a high light information included in the PCI packet 50 is separated or extracted by the PCI decoder 95, and is outputted as a high light signal Shi to the high light buffer 96. The portion of the PCI packet 50 other than the high light information is outputted as a PCI information signal Spci to the system controller 100.

The high light buffer 96, to which the high light signal Shi is inputted, consists of a FIFO memory, for example. The high light buffer 96 temporarily stores the inputted high light signal Shi and outputs it to the high light decoder 97. The high light buffer 96 is to time-compensate the high light signal Shi so as to precisely perform a change in the display condition of the selection item, which corresponds to the high light information, in correspondence with the sub picture signal Ssp which includes the video information for the high light information. Then, the time-compensated high light signal Shi is decoded by the high light decoder 97, and the information included in the high light signal Shi is outputted as a decoded high light signal Shid to the system controller 100. Here, the system controller 100 outputs the aforementioned high light control signal Sch to change the display condition by the high light information, on the basis of the decoded high light signal Shid.

On the basis of the control information Sc inputted from the system buffer 85, the PCI information signal Spci inputted from the PCI decoder 95 and an input signal Sin inputted from the input unit 98 such as a remote controller, the system controller 100 outputs the aforementioned switch signal Ssw2, the language selection signal Slc, the pause signal Sca and the high light control signal Sch to correctly perform the reproduction corresponding to those input signals, and also outputs a display signal Sdp to display an operation condition etc. of the reproducing apparatus S2 to the display unit 99 such as the liquid crystal device.

Further, the system controller 100 outputs a seamless control signal Scsl corresponding to the track jump process, to the drive controller 101, when it detects by the control signal Sc etc. that it is necessary to perform the track jump process such as a search in order to perform the seamless reproduction.

Then, the drive controller 101, to which the seamless control signal Scsl is inputted, outputs a drive signal Sd to the spindle motor 102 or the slider motor 103. By this drive signal Sd, the spindle motor 102 or the slider motor 103 moves the optical pickup 80 such that the record position to be reproduced on the DVD 1 is irradiated with the light beam B (refer to an arrow of a broken line in FIG. 16), and the spindle motor 102 CLV-controls (Constant Linear Velocity-controls) the rotation number of the DVD 1. Along with this, the drive controller 101 outputs the aforementioned switch signal Ssw1 on the basis of the seamless control signal Scsl, so as to open the stream switch 82 when the demodulation signal Sdm is not outputted from the demodulate and correct unit 81 while the optical pickup 80 is being moved, and so as to close the stream switch 82 when the demodulation signal Sdm is started to be outputted, so that the demodulation signal Sdm is outputted to the track buffer 83.

Next, out of the operation of the reproducing apparatus S2, the operation of the system controller 100 for reproducing information will be described with reference to the flowchart shown in FIG. 17.

Here, it is assumed that the reproducing apparatus S2 is set in advance for use in the United States, that the video manager 2 in the DVD 1 is recorded with the parental management table information PINF which includes the parental management table PMT shown in FIG. 6 and that the parental management table is recorded with the title parental IDs shown in FIG. 7.

Figure 17:
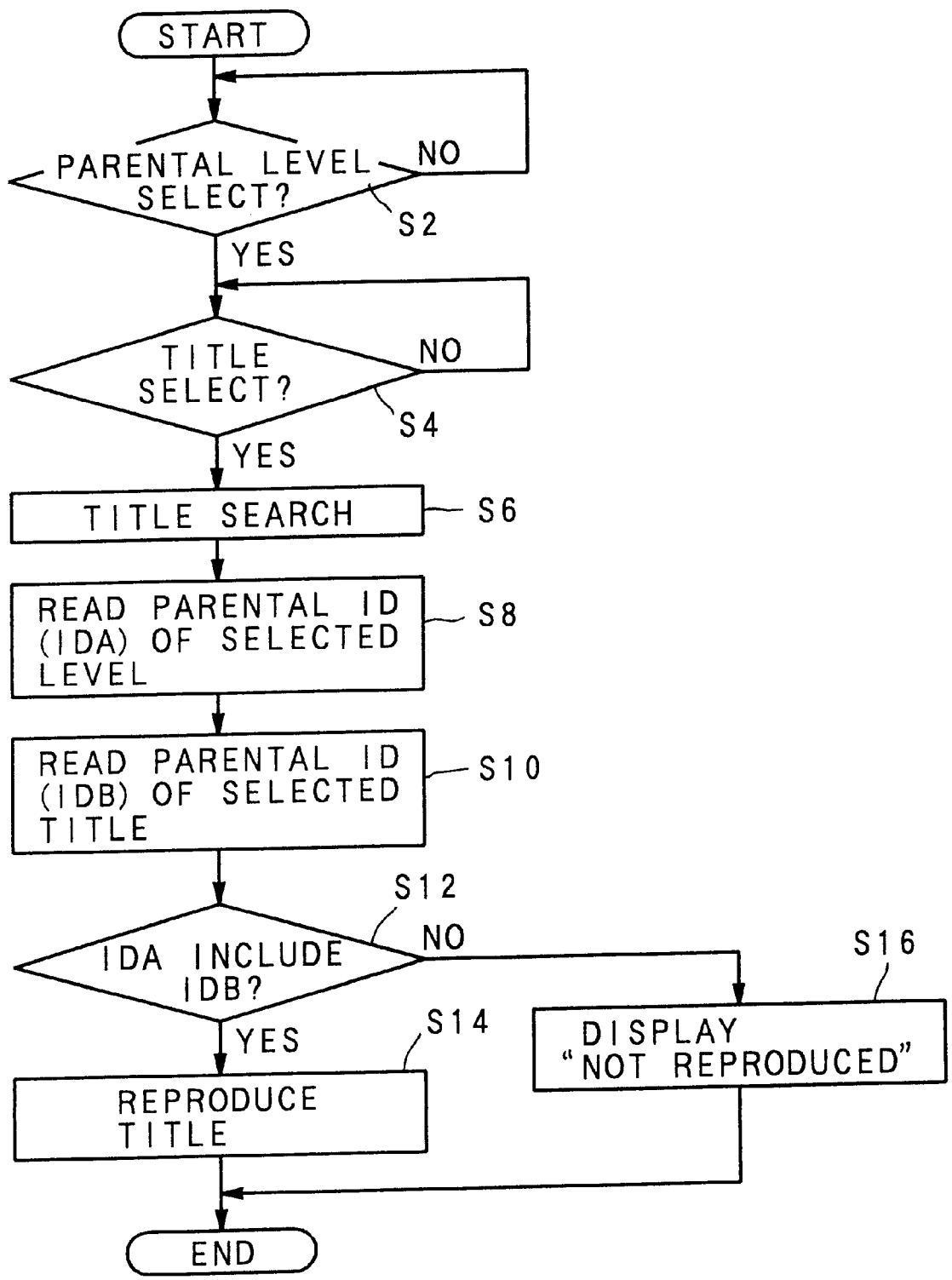
FIG. 17 is a flowchart illustrating an operation of reproducing information according to the present invention.

In FIG. 17, the system controller 100 first judges whether or not the parental level is selected (step S2). Now, it is assumed that the U.S. parental level 3 (i.e., NC17) is selected. After the parental level is selected (step S2:Y), the system controller 100 judges whether or not the title to be reproduced is selected (step S4). If the title is selected (step S4:Y), the system controller 100 instructs the searching for the selected title (step S6). Thereafter, the system controller 100 reads out the parental ID (IDA) corresponding to the parental level 3 (NC17) from the parental management table recorded on the disk (step S8), and reads out the title parental ID (IDB) of the title selected in step S4 from the disk (step S10). Then, the system controller 100 judges whether or not the parental ID IDB is included in the parental ID IDA (step S12). Here, in the parental ID IDA corresponding to the U.S. level 3 the flags at the ID numbers 4, 3 and 0 are "1". Therefore, it is judged in step S12 whether or not the flag of the title parental ID of the selected title is "1" in one of the ID numbers 4, 3 and 0. If the parental ID IDB is included in the parental ID IDA (step S12:Y), that is, if the title T4 which flag at the ID number 3 of the parental ID is "1" is selected in step S4, for example, the title is reproduced (step S14). On the other hand, if the parental ID IDB is not included in the parental ID IDA, that is, if the title T1 which parental ID has the flag at the designation place 5 is "1" is selected in step S4, for example, the title is not reproduced. In this case, the message saying that "Selected title is not reproduced" is displayed on the display 99 (step S16), and the operation ends.

According to the configuration described above, it is possible to reproduce the disk in which the information related to the parental control in the various countries are recorded in the video manager 2 and only the parental IDs for identification are recorded (i.e., information related to the countries are not recorded in the titles). According to the reproducing apparatus S2, it is possible to reproduce the recorded information in a manner being matched with the different parental levels determined in various countries.

What is claimed is:

1. An information recording medium reproduced by an information reproducing apparatus which comprises: a level selecting means for selecting a reproduction permission level; a data group selecting means for selecting one data group out of a plurality of data groups; a detecting means for detecting a range of the reproduction permission level of the data group, which reproduction is permitted, on the basis of the reproduction permission level selected; and a reproducing means for reproducing the data group if the reproduction permission level of the selected data group is included in the range of the reproduction permission level detected, said information recording medium comprising a data structure stored in said information recording medium and including:

a plurality of data groups, each including at least one of video information and audio information and a reproduction permission level indicative of a level by which a reproduction of at least one of the video information and the audio information is permitted; and a reproduction management information including the reproduction permission range information for pre-scribing the range of the reproduction permission level, on the basis of the reproduction permission levels, for the data group which reproduction is permitted, said reproduction permission range information comprising an aggregation of a plurality of reproduction permission range information units corresponding to a plurality of countries, respectively.

2. An information recording medium according to claim 1, wherein said reproduction management information includes a plurality of the reproduction permission range information, and one reproduction permission range information is selected by said reproducing apparatus from the plurality of the reproduction permission range information.

3. An information recording apparatus for recording information on an information recording medium reproduced by an information reproducing apparatus which comprises: a level selecting means for selecting a reproduction permission level; a data group selecting means for selecting one data group out of a plurality of data groups; a detecting means for detecting a range of the reproduction permission level of the data group, which reproduction is permitted, on the basis of reproduction permission level selected; and a reproducing means for reproducing the data group if the reproduction permission level of the selected data group is included in the range of the reproduction permission level detected, said information recording apparatus comprising:

a first recording means for recording, on said information recording medium, a plurality of data groups, each including at least one of video information and audio information and a reproduction permission level indicative of a level by which a reproduction of at least one of the video information and the audio information is permitted; and a second recording means for recording, on said information recording medium, a reproduction management information including the reproduction permission range information for prescribing the range of the reproduction permission level, on the basis of the reproduction permission levels, for the data group which reproduction is permitted, said reproduction permission range information comprising an aggregation of a plurality of reproduction permission range information units corresponding to a plurality of countries, respectively.

4. An information recording apparatus according to claim 3, wherein said second recording means includes a plurality of the reproduction permission range information selected by said information reproducing apparatus in the reproduction management information.

5. An information reproducing apparatus for reproducing an information recording medium which is recorded with a plurality of data groups, each including at least one of video information and audio information and a reproduction permission level by which a reproduction of at least one of the video information and the audio information is permitted; and a reproduction management information including the reproduction permission range information for prescribing the range of the reproduction permission level, on the basis of the reproduction permission levels, for the data group which reproduction is permitted, said reproduction permission range information comprising an aggregation of a plurality of reproduction permission range information units corresponding to a plurality of countries, respectively, said reproducing apparatus comprising:

a level selecting means for selecting the reproduction permission level;

a data group selecting means for selecting one data group out of the plurality of the data groups;

a detecting means for detecting, from the reproduction permission range information, the range of the reproduction permission level of the data group, which reproduction is permitted, on the basis of the selected reproduction permission level selected;

a judging means for judging whether or not the reproduction permission level of the selected data group is included in the range of the reproduction permission level detected; and a reproducing means for reproducing the data group if the judging means determined that the reproduction permission level of the selected data group is included in the range of the reproduction permission level detected.

6. An information reproducing apparatus according to claim 5, wherein said reproducing means does not perform reproduction when the judging means determines that the reproduction permission level of the detected data group is not included in the range of the reproduction permission level detected.

7. An information reproducing apparatus according to claim 5, wherein the reproduction management information includes a plurality of the reproduction permission range information, and said reproducing apparatus further comprising a reproduction permission range information selecting means for selecting one reproduction permission range information out of the plurality of the reproduction permission range information.

8. A medium according to claim 1, wherein said reproduction permission level and said reproduction permission range information unit comprise multi-bit data arrays of identical bit number.

9. A medium according to claim 8, wherein the reproduction of the data group is permitted if the data array of the reproduction permission level of the selected data group is included in the data array of the reproduction permission range information unit.

10. A medium according to claim 1, wherein said reproduction management information comprises:

a management table including information relating to a plurality of different countries, each country having a corresponding reproduction permission range information unit; and search pointers including code information indicating names of the respective countries and address information indicating recording addresses of the respective reproduction permission range information units corresponding to the respective countries.

\* \* \* \* \*